United States Patent Office 2,747,790
Patented May 29, 1956

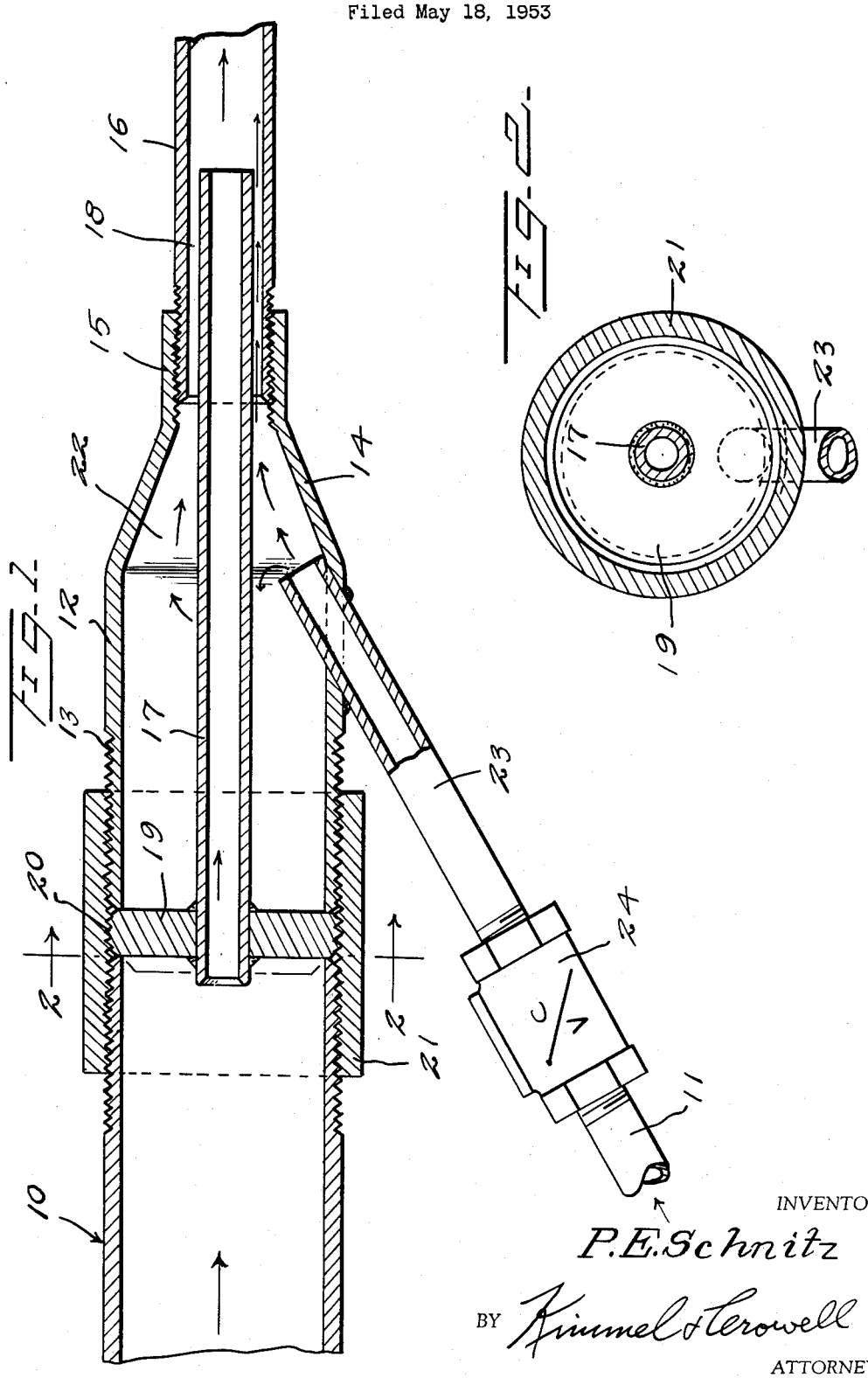

2,747,790

FLUID SUCTION AND MIXING DEVICE

Ples E. Schnitz, El Paso, Tex.

Application May 18, 1953, Serial No. 355,830

1 Claim. (Cl. 230—95)

This invention relates to a fluid suction and mixing device.

In the transmission of fluid, such as gas, from a series of wells to a main pipe line considerable difficulty is encountered by reason of the pressure differential in the various wells. It is, therefore, an object of this invention to provide a means whereby wells of different pressures may be coupled to a main line and the gas from the low pressure wells will be mixed with the gas from the high pressure wells so that an even flow of gas from the high and low pressure wells will result.

Another object of this invention is to provide a suction and mixing device wherein moving parts are eliminated, so that the device will be effective at all times.

A further object of this invention is to provide a device of this kind which is simple in construction, and will assure a flow of gas from low pressure wells and eliminate the necessity of using separate high and low pressure transmission lines.

With the above and other objects in view, my invention consists in the arrangement, combination and details of construction disclosed in the drawing and specification, and then more particularly pointed out in the appended claim.

In the drawing:

Figure 1 is a longitudinal section partially in detail, of a fluid suction and mixing device constructed according to an embodiment of this invention.

Figure 2 is a sectional view taken on the line 2—2 of Figure 1.

Referring to the drawing the numeral 10 designates generally a main pipe line, which is connected with a high pressure fluid well such as a gas well, and the numeral 11 designates generally a low pressure pipe line adapted to be connected to a low pressure gas well.

In order to provide a means whereby the gas or fluid from the low pressure line 11 may be mixed with the gas in the high pressure line 10, I have provided a combined suction and mixing device which includes a cylindrical member 12, which is formed with exterior threads 13 at one end thereof. The cylindrical body 12 is provided at its forward end with a tapered extension 14 and a nipple 15 extends from the extension 14.

A reduced diameter high pressure pipe line 16 is threaded into the nipple 15 and the pipe line 16 is adapted to carry gas which is of a pressure substantially less than the pressure of the gas in pipe line 10, but is of a higher pressure than the gas in the low pressure line 11. A pressure reducing tube 17 is disposed concentrically in the body 12 and projects forwardly through extension 14 and through nipple 15 into the adjacent end of pipe line 16.

The exterior diameter of tube 17 is substantially less than the interior diameter of pipe line 16 so as to thereby provide a passage 18 whereby the gas from the low pressure line 11 may be drawn into the pipe line 16. The rear end of the tube 17 has secured thereto a plate or head 19 which is externally threaded as at 20 and plate 19 is adapted to abut the adjacent or forward end of the high pressure line 10. The plate 19 is threaded into a cylindrical coupling sleeve 21, which is threaded into the adjacent ends of pipe line 10 and the cylindrical body 12.

The tube or nozzle 17 provides a means whereby the velocity of the gas from high pressure line 10 will be increased with reduction in pressure, so that the increased velocity of the gas being discharged from the forward end of tube or nozzle 17 and the pipe line 16 will form a suction in chamber 22, which is within the forward end of the cylindrical body 12 and tapered extension 14.

A tube 23 is secured at an oblique angle to body 12 and opens at its forward end into chamber 22. The tube 23 is adapted to be connected to the low pressure fluid line 11 by means of a check valve 24 which opens forwardly, so that when the partial vacuum or suction is created in chamber 22, the low pressure gas from line 11 will be drawn into chamber 22 and will flow through passage 18 into pipe line 16.

With a combined suction and mixing or pressure reducing device as hereinbefore described, a series of differential pressure pipe lines may be connected to a common transmission line, and the high pressure gas will constitute a power means or motive force whereby the gas in the low pressure line may be drawn into the transmission line. This device will eliminate the necessity of using a booster pump for boosting the pressure of the gas from line 11 to a pressure substantially equal to the pressure line in the high pressure line 10.

What is claimed is:

A fluid suction and mixing device coupling high and low pressure fluid lines to a common transmission line comprising a hollow cylindrical body having inlet and outlet ends, external threads formed on said body at the inlet end thereof, an internally threaded sleeve engaged over the threaded end of said body and adapted to connect said body to a high pressure fluid line, a nipple having a diameter substantially less than the diameter of said body, a tapered extension integrally joining said nipple to said body, a disc-shaped head threadedly engaged in said sleeve between the adjacent ends of said body and said high pressure fluid line, said head having a bore extending therethrough with the axis of said bore common with the axis of said body, a small diameter hollow nozzle projecting through said bore and secured to said head, said nozzle extending through said nipple into said common transmission line in radially inwardly spaced relation thereto, an obliquely inclined tube extending rearwardly from a point on said body adjacent said tapered extension for communicating said body to a low pressure line, and a forwardly opening check valve connected between the rear end of said tube and said low pressure line.

References Cited in the file of this patent

UNITED STATES PATENTS

| 351,854 | Delhaye | Nov. 2, 1886 |
|---|---|---|
| 509,400 | Ruble | Nov. 28, 1893 |
| 1,415,467 | Pickop | May 9, 1922 |
| 1,777,817 | Whittington | Oct. 7, 1930 |